United States Patent [19]

Schultheiss

[11] Patent Number: 4,718,056
[45] Date of Patent: Jan. 5, 1988

[54] OPTICAL MULTIPLEXER DEVICE

[75] Inventor: Nicolaas G. Schultheiss, Gouda, Netherlands

[73] Assignee: NKF Groep Nederlandsch Octrooibureau, The Hague, Netherlands

[21] Appl. No.: 841,133

[22] Filed: Mar. 18, 1986

[30] Foreign Application Priority Data

Mar. 20, 1985 [NL] Netherlands ............... 8500806

[51] Int. Cl.<sup>4</sup> ............................................. H04B 9/00
[52] U.S. Cl. ...................................... 370/3; 350/96.18; 350/96.19
[58] Field of Search ............... 350/96.18, 96.19, 96.15; 370/2, 3, 1

[56] References Cited

FOREIGN PATENT DOCUMENTS

| 73314 | 3/1983 | European Pat. Off. | 370/1 |
| 74152 | 3/1983 | European Pat. Off. | 370/1 |
| 3316511 | 11/1984 | Fed. Rep. of Germany | 350/96.15 |
| 2152317 | 7/1985 | United Kingdom | 370/3 |

OTHER PUBLICATIONS

Aoyama, K. et al., "Low-Loss Optical Demultiplexer for WDM Systems in the 0.8 μm Wavelength Region," App. Optics, vol. 18, No. 16, pp. 2834-2836 (Aug. 15, 1979).

Tomlinson, W. J., "Wavelength Multiplexing in Multimode Optical Fibers," App. Optics, vol. 16, No. 8, pp. 2180-2194 (Aug. 1977).

Primary Examiner—Joseph A. Orsino, Jr.
Attorney, Agent, or Firm—Carl G. Love

[57] ABSTRACT

A multiplexer device includes a plurality of optical fibers. One of the end faces of each of the fibers is arranged in a common plane. The fibers include a first optical fiber for conducting several light signals of different wavelengths and at least two second optical fibers, each of which conduct a light signal in a single waveband. The device also includes a wavelength-selective element (33) and a lens system (51, 53) which is arranged between the wavelength-selective element and the common plane. In order to minimize the number of components of the device and to facilitate adjustment during assembly, the lens system is formed by a plane parallel, transparent plate (51) which bears against the end faces (9, 11) of the optical fibres as well as by a lens (53) having the shape of a flattened sphere whose plane surface rests on the plate.

9 Claims, 9 Drawing Figures

OPTICAL MULTIPLEXER DEVICE

BACKGROUND OF THE INVENTION

The invention relates to an optical multiplexer device which includes a plurality of optical fibers. One end face of each optical fiber is arranged in a common plane. The fibers include a first optical fiber for conducting several light signals of different wavelengths, and at least two second optical fibers each of which conduct a light signal in a single waveband.

The device further includes a wavelength-selective element, and a lens system which is arranged between the wavelength-selective element and the common plane. The arrangement is such that a low-attenuation transmission path which is dependent on the wavelength of the light is formed between the first optical fiber and each of the second optical fibers.

The optical multiplexer device may be a multiplexer as well as a demultiplexer. In the former case, the second optical fibers provide the input signals while the first optical fiber receives the output signal. In the latter case, the first optical fiber is the input fiber while the second optical fibers are output fibers. A device of this kind is described in European Patent Application No. 74,152.

The construction of the device described above is comparatively complex. This is due, inter alia, to the fact that the orientation of the wavelength-selective element with respect to the incident light beam is adjustable. In many cases, however, it is sufficient to adjust the device properly during assembly; adjustability during operation is then no longer necessary. In such cases it is notably important that the cost of the device be as low as possible.

SUMMARY OF THE INVENTION

Therefore, it is an object of the invention to provide an optical multiplexer device which comprises only a very small number of components, and which can be comparatively simply adjusted during assembly. To achieve this, in the device according to the invention the lens system includes a plane parallel, transparent plate. A first main surface of the plate is arranged against the end faces of the optical fibers in the common plane. The lens system and also includes a lens having the shape of a flattened sphere whose plane surface is arranged against the second main surface of the plate.

The thickness of the transparent plate determines the distance between the lens and the end faces of the fibers. This thickness can be preselected so that the focal point of the lens is situated in the common plane and the focal distance of the lens need not be adjusted. The direction of the light beams emerging from the lens can be simply adjusted during assembly by displacing the lens across the plate. When the correct position is reached, the lens can be secured in that position by a suitable adhesive.

In a preferred embodiment of the device according to the invention, it is particularly simple to secure the transparent plate against the end faces of the fibers and to mount the wavelength-selective element, because the common plane in which the end faces of the optical fibers are situated coincides with an end face of a fiber holder in which the end portions of the fibers are retained. The first main surface of the transparent plate bears against the end face. The lens system is accommodated in a wedge-shaped space which is recessed in a housing. The wedge-shaped space is bounded by a first wedge face which extends parallel to the end face of the fiber holder and by a second wedge face against which the wavelength-selective element is arranged.

DESCRIPTION OF THE PREFERRED EMBODIMENTS

Figure 1:
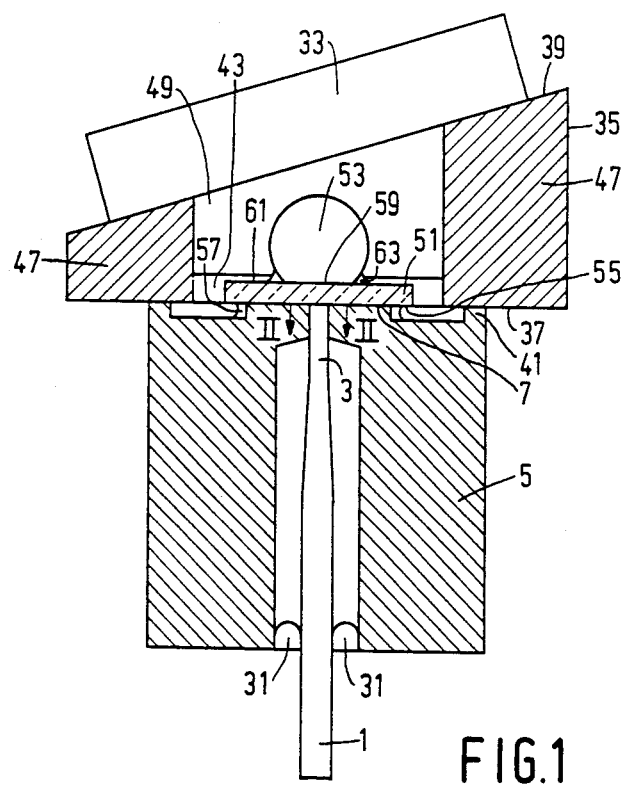
FIG. 1 is a longitudinal sectional view of a first embodiment of a multiplexer device.

FIG. 1 shows a multiplexer device which includes a plurality of adjacent optical fibers which are arranged so as to form a ribbon 1. At the end 3 of the ribbon 1 the protective sheath of the fibers has been removed, so that the width at this end is smaller than that of the remainder of the ribbon.

The end portions of the fibers are retained in a fiber holder 5. Fiber holder 5 has an end face 7 which coincides with a common plane in which the end faces of the optical fibers are situated.

Figure 2:
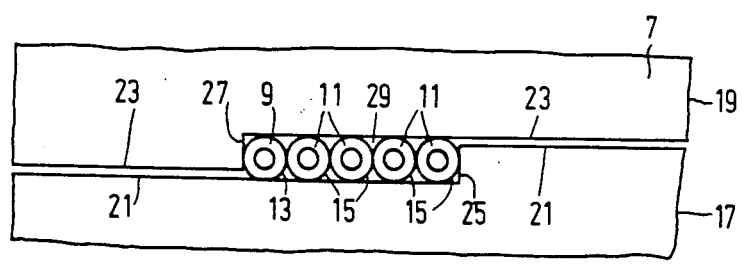
FIG. 2 is a top plan view at an increased scale of the fiber holder 5 of the device shown in FIG. 1.

FIG. 2 shows a part of the end face 7, together with the end faces 9 and 11 of the optical fibers 13 and 15. The optical fibers include a first fiber 13 for conducting several light signals of different wavelengths, and four second optical fibers 15, each of which conducts a light signal in a single waveband.

The fiber holder 5 of the embodiment shown in FIGS. 1 and 2 consists of two portions 17 and 19, each of which has a mainly plane side 21 and 23, respectively. The sides 21 and 23 are arranged one against the other.

In each side 21 and 23 there is provided a step 25 and 27, respectively, so that between the portions 17 and 19 there is formed a rectangular space 29 in which the end portions of the optical fibers 13 and 15 are retained. The end portions of all optical fibers 13 and 15 have the same diameter, and the two portions 17 and 19 of the fiber holder 5 are arranged one against the other in such a manner that the width of the rectangular space 29 is equal to this diameter. The length of space 29 is equal to the diameter multiplied by the number of fibers, so in this embodiment, the length is five times the diameter.

During the clamping of the end portions of the fibers 13 and 15, the space 29 is filled with an adhesive which has not yet set, for example an epoxy glue. After the setting of the adhesive, the two portions 17 and 19 and the fibers 13 and 15 form a rigid assembly which can be polished so that the end faces 9 and 11 and the end face 7 are situated in a common plane. For strain-relief of the glued joint thus formed, the ribbon 1 can be secured to the fiber holder 5 by means of a further glued joint 31 (FIG. 1.)

Opposite the end face 7 of the fiber holder 5 there is arranged a wavelength-selective element 33 in the form of a reflection grating. The wavelength-selective element 33 is secured on a wedge-shaped housing 35. The housing 35 includes two wedge faces 37 and 39. The first wedge face 37 bears against the holder 5. The wavelength-selective element 33 is secured against the second wedge face 39, for example by means of a suitable glue such as a cyano-acrylate glue.

The first wedge face 37 bears on an edge 41 which is formed on the fiber holder 5. Edge 41 encloses the end face 7, so that the first wedge face extends parallel to the end face 7. The angle between the two wedge faces 37 and 39 (the wedge angle) thus determines the angle between the axes of the optical fibers 13 and 15 on the one side, and the plane of the grating 33 on the other side.

Figure 3:
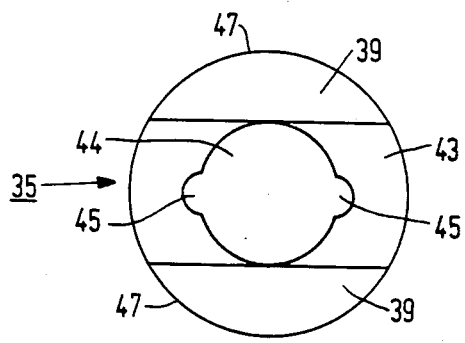
FIG. 3 is a top plan view at a reduced scale of the housing 35 of the device shown in FIG. 1.

FIG. 3 is a top plan view at a reduced scale of the housing 35. The housing 35 includes an annular base portion 43 which is provided with a central aperture 44 for accommodating the end face 7. In the base portion 43 there are formed two semicircular recesses 45 which adjoin the central aperture 44 and which accommodate screws (not shown) for securing the housing 35 to the fiber holder 5. Some clearance exists between the screws and the recesses 45 so that, prior to the tightening of the screws, the housing can still be shifted slightly for exact adjustment of the grating 33 with respect to the end faces 9 and 11 of the fibers 13 and 15. On both sides of the central aperture 44 there are provided two ridges 47, the upper faces of which define the second wedge face 39.

Between the two ridges 47 there is formed a wedge-shaped space 49 which is bounded by the two wedge faces 37, 39. (FIG. 1.) Wedge-shaped space 49 accommodates a lens system which includes a plane parallel transparent plate 51 (for example, a glass plate) and a plano-spherical lens 53 (for example, a saphire lens) which is secured on plate 51. A first main surface 55 of the plate 51 bears against the end face 7 of the fiber holder 5 and against the end faces 9 and 11 of the optical fibers 13 and 15 which are flush with this end face. The plate 51 is secured to the fiber holder 5 by means of a suitable glue (for example, Norland UV setting lens cement). The glued joint is denoted by the reference numeral 57 in FIG. 1.

The flat surface 59 of the lens 53 bears against the second main surface 61 of the plate 51. Lens 53 is secured to the plate 51 by means of a glued joint 63 which may be made of the same type of glue as used for the joint 57.

Figure 4A:
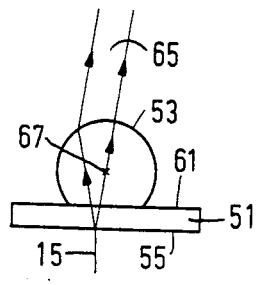
FIGS. 4A and 4B schematically illustrate the paths of the light rays during the adjustment of the lens system of the device shown in FIG. 1.
Figure 4B:
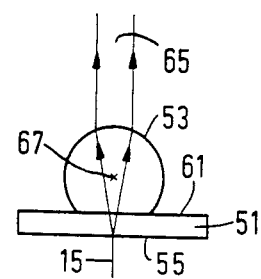

Before the setting of the glue of the glued joint 63 by irradiation by ultraviolet light, the lens 53 is displaced across the plate 51 until it reaches the correct position. This is illustrated in FIGS. 4A and B. FIGS. 4A and 4B schematically show one of the two optical fibers 15 and the plate 51 and the lens 53. The thickness of the plate 51 has been chosen so that the focal plane of the lens 53 coincides with the first main surface 55 of the plate. Because the end face 11 of the fiber 15 bears against this first main surface 55, the light emerging from end face 11 is shaped into a parallel light beam 65 by the lens 53.

The center of the lens 53 is denoted by the reference numeral 67 in FIGS. 4A and 4B. When this center is not situated on the axis of fiber 15, the beam 65 encloses an angle with respect to the normal to the plate 51 (see FIG. 4A). When the lens 53 is displaced across the second main surface 61 of the plate 51, this angle changes. When the center 67 is situated on the axis of the optical fiber 15, this angle equals zero, which means that the beam 65 is directed perpendicular to the plate 51.

As is known (for example, in the article by W. J. Tomlinson entitled "Wavelength multiplexing in multimode optical fibers" in *Applied Optics,* Vol. 16, No. 8, pp 2180–2194, August, 1977 notably the section entitled "Blazed Gratings" on pages 2184 and 2185), the angle at which light is reflected by a grating depends not only on the properties of the grating and the wavelength of the light, but also on the angle of incidence of the light on the grating. Because this angle of incidence can be simply changed in the described manner, the multiplexer device can be adjusted by shifting the lens 53 so that light of a given wavelength (or in a given narrow waveband) from one of the second optical fibers 15 is reflected to the first optical fiber 13 by the grating 33. Because the second optical fibers 15 are adjacent to each other, the distance between the center 67 of the lens 53 and the axis of each fiber will differ. Consequently, the light reflected from each of these fibers to the first optical fiber 13 will form part of a different waveband.

A low-attenuation transmission path which depends on the wavelength of the light is thus formed between each of the second optical fibers 15 on the one side and the first optical fiber 13 on the other side. Because the path of the light rays is reversible, these wavelength-dependent paths also exist in the reverse direction, so that the device can be used not only as a multiplexer but also as a demultiplexer.

The lens 53 can be displaced across the plate 51 for as long as the glue forming the glued joints 63 (see FIG. 1) has not yet set. Once the lens 53 reaches the desired position, the glue is exposed to ultraviolet light, after which the lens will be rigidly secured to the plate 51. The wavebands conducted by the various optical fibers are thus defined.

Figure 5:
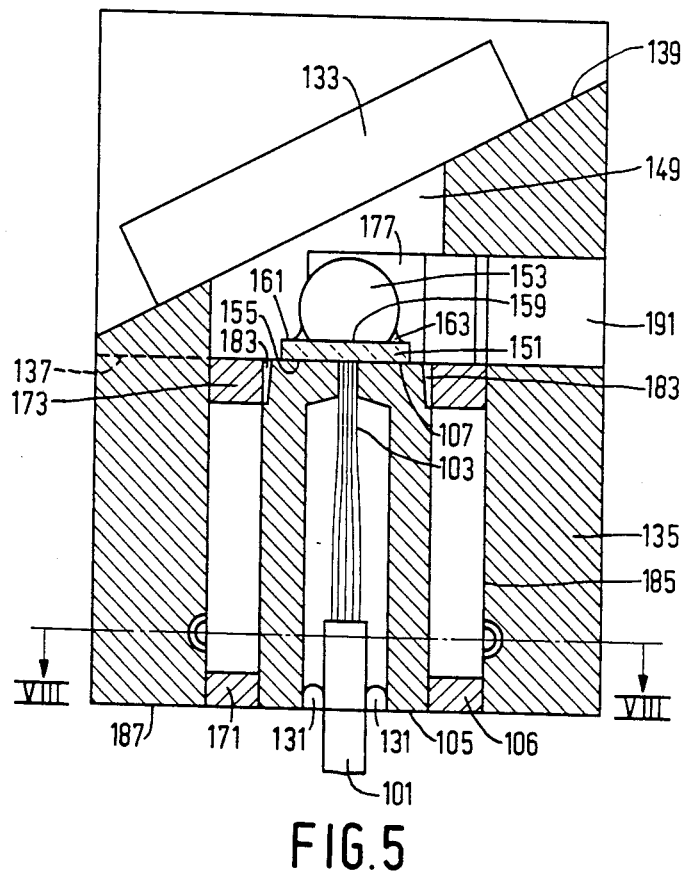
FIG. 5 is a longitudinal sectional view of a second embodiment of a multiplexer device according to the invention.

The multiplexer device shown in FIG. 5 includes a cable 101 in which a number of optical fibers are arranged in a rather arbitrary manner. The protective envelopes have been removed from the free end portions of the fibers which are arranged so as to form a ribbon 103. Ribbon 103 is retained in a fiber holder which consists of an inner portion 105 and an outer portion 106.

The inner portion 105 itself consists of two portions between which the fibers are retained in the same way as between the two portions 17 and 19 of the fiber holder 5 (see FIGS. 1 and 2). The inner portion 105 is secured in the outer portion 106. Outer portion 106 will now be described in detail with reference to FIGS. 6 and 7.

Figure 6:
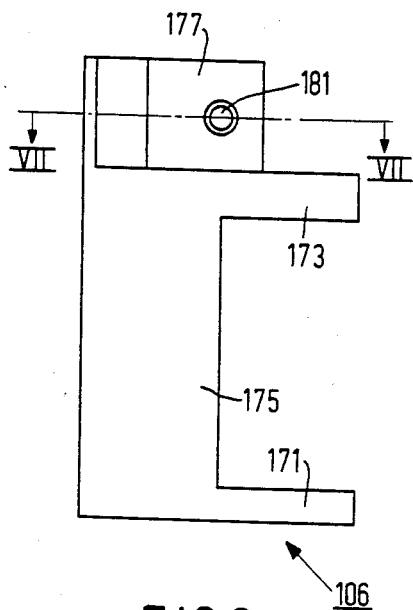
FIG. 6 is a side elevational view of the outer portion 106 of the fiber holder of the device shown in FIG. 5.
Figure 7:
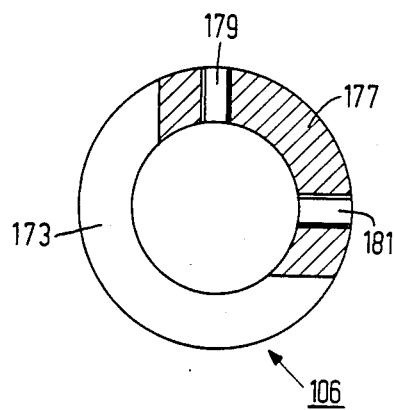
FIG. 7 is a cross-sectional view on line VII—VII of FIG. 6.

FIG. 6 is a side elevational view of the outer portion 106 (viewed from the left in FIG. 5) and FIG. 7 is a cross-sectional view taken along the line VII—VII of FIG. 6. The outer portion 106 includes a lower ring 171 and an upper ring 173 which are interconnected by means of an approximately semi-cylindrical intermediate portion 175. On the upper ring 173 there is arranged an adjusting device 177 in the form of a portion of a cylindrical envelope provided with two threaded apertures 179 and 181 which extend perpendicular to one another in the direction of the cylinder axis.

After the fiber ribbon 103 has been glued into the inner portion 105 of the fiber holder in the manner described with reference to FIG. 2, and the cable 101 has also been connected to the inner portion 105 by means of another glued joint 131, the inner portion 105 is inserted from below through the apertures in the rings 171 and 173 of the outer portion 106. Inner portion 105 is inserted until its end face 107, in which the end faces of the optical fibers are also situated, coincides with the upper face of the upper ring 173. In order to facilitate the introduction of the inner portion 105 into the rings 171 and 173, the upper end portion of the inner portion 105 is conical so that a clearance remains between the upper end portion and the upper ring 173; this clearance can be filled with a suitable glue 183 for interconnection of the two portions of the fiber holder.

On the end face 107 there is provided a plane parallel, transparent plate 151. The first main surface 155 of plate 151 is arranged against the end face 107 of the inner portion 105 of the fiber holder. Against the second main surface 161 of the plate 151 there is arranged the flat surface 159 of a plano-spherical lens 153. The lens system thus formed corresponds to the lens system described with reference to FIG. 1.

The fiber holder 105/106 is accommodated in a central cavity 185 which is recessed in a housing 135. Cavity 185 extends from a lower end face 187 of the housing 135 to a space 149 which is also recessed in the housing 135. Space 149 is bounded at its lower side by a first wedge face 137 which extends parallel to the end face 107 and which coincides therewith in the present example. The wedge-shaped space 149 is bounded at its upper side by a second wedge face 139. A wavelength-selective element 133 in the form of a reflection grating is arranged against wedge face 139.

Figure 8:
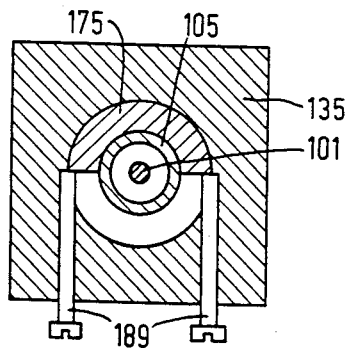
FIG. 8 is a cross-sectional view on line VIII—VIII of FIG. 5 at a reduced scale.

FIG. 8 is a cross-sectional view of the housing 135, taken along the line VIII—VIII in FIG. 5. FIG. 8 also shows the cable 101, the inner portion 105 of the fiber holder, and the intermediate portion 175 of the outer portion of the fiber holder. Also visible are two adjusting screws 189 which have been screwed into the housing 135. The ends of screws 189 bear against the intermediate portion 175 at diametrically opposite points. By screwing one adjusting screw 189 further into the housing and by screwing the other adjusting screw further out, the fiber holder 105/106 can be rotated about its longitudinal axis in order to shift the plane of the ribbon 103 to the desired position with respect to the grating 133. If desired, the fiber holder 105/106 can subsequently be secured in the housing 135 by means of a suitable glue (not shown), after which the adjusting screws 189 can be removed.

As appears from FIG. 5, the lens system 151 and 153 which is partly enclosed by the adjusting device 177 is situated in the wedge-shaped space 149. Adjusting screws (not shown) can be screwed into both threaded apertures 179 and 181 (see FIG. 7). The ends of the screws then press against the lens 153 in two mutually perpendicular directions. The adjusting screws are accessible from the outside via apertures 191 in the housing 135. One of these apertures 191 is visible in FIG. 5.

Using the adjusting screw screwed into the aperture 179, the lens 153 can be positioned exactly over the plane of the ribbon 103, so that the attenuation of the light can be minimized. Using the adjusting screw screwed into the aperture 181, the center of the lens 153 can be shifted with respect to the axes of the individual fibers of the ribbon 103 in the manner described with reference to the FIGS. 4A and 4B. The lens 153 can again be secured on the plate 151 by means of glue 163 which is cured after completion of the described adjusting operations. If desired, the adjusting screws may subsequently be removed.

What is claimed is:

1. An optical multiplexer comprising:
    a first optical fiber having an end face, said first optical fiber arranged to conduct two or more light signals of different wavelengths;
    at least two second optical fibers having end faces, each second optical fiber arranged to conduct a light signal in a single waveband, the end faces of the first and second optical fibers being arranged in a first plane;
    a transparent plate having first and second opposite planar surfaces, the first and second surfaces being parallel to each other, the first surface being arranged against the end faces of the first and second optical fibers;
    a spherical lens having a planar flattened portion, said flattened portion being arranged against the second surface of the plate opposite the end faces of the fibers; and
    a wavelength-selective element arranged on a side of the lens opposite the plate so that low attenuation wavelength-dependent optical paths are formed between the first optical fiber and the second optical fibers.

2. An optical multiplexer as claimed in claim 1, characterized in that the end faces of the first and second optical fibers are arranged in a straight line.

3. An optical multiplexer as claimed in claim 2, further comprising means for adjusting the position of the lens of the second surface of the plate.

4. An optical multiplexer as claimed in claim 3, characterized in that the adjusting means is capable of adjusting the position of the lens on the second surface of the plate independently in two intersecting directions.

5. An optical multiplexer as claimed in claim 4, characterized in that:
    the lens has a focal plane; and
    the first surface of the plate is in the focal plane of the lens.

6. An optical multiplexer as claimed in claim 1, further comprising means for adjusting the position of the lens on the second surface of the plate.

7. An optical multiplexer as claimed in claim 6, characterized in that the adjusting means is capable of adjusting the position of the lens on the second surface of the plate independently in two intersecting directions.

8. An optical multiplexer as claimed in claim 1, further comprising:
    a fiber holder for retaining the ends of the first and second optical fibers, said holder having an end face in the first plane, the end face of the fiber holder bearing against the first surface of the plate; and
    a housing having a wedge-shaped space containing the lens, the wedge-shaped space being bounded by first and second opposite wedge faces, the first wedge face extending parallel to the first plane, the second wedge face extending obliquely to the first plane, said second wedge face arranged against the wavelength-selective element.

9. An optical multiplexer as claimed in claim 8, characterized in that the housing also has a space for accommodating the fiber holder.

* * * * *

UNITED STATES PATENT OFFICE
CERTIFICATE OF CORRECTION

PATENT NO. : 4,718,056
DATED : January 5, 1988
INVENTOR(S) : Nicolaas G. SCHULTHEISS It is certified that error appears in the above-identified patent and that said Letters Patent are hereby corrected as shown below:

In the heading:

[73]    Assignee:    NKF Groep B.V.
                     Rijswijk, The Netherlands Signed and Sealed this Tenth Day of January, 1989

Attest:

DONALD J. QUIGG

*Attesting Officer*   Commissioner of Patents and Trademarks